United States Patent [19]

Ban

[11] 4,072,881
[45] Feb. 7, 1978

[54] AXIAL-AIR-GAP TYPE SEMICONDUCTOR ELECTRIC MOTOR

[76] Inventor: Itsuki Ban, 829, Higashioizumi, Nerima, Tokyo, Japan

[21] Appl. No.: 724,259

[22] Filed: Sept. 17, 1976

[30] Foreign Application Priority Data

Nov. 6, 1975 Japan .............................. 50-132471
Dec. 20, 1975 Japan .............................. 50-151245

[51] Int. Cl.² ................................................ H02K 29/00
[52] U.S. Cl. ................................ 318/138; 310/156; 310/233; 310/268
[58] Field of Search ............... 318/138, 254; 310/164, 310/156, 233, 268

[56] References Cited

U.S. PATENT DOCUMENTS 3,437,897  4/1969  Lenny .................................. 318/138

Primary Examiner—Herman J. Hohauser
Attorney, Agent, or Firm—Lane, Aitken, Dunner & Ziems

[57] ABSTRACT

An axial-air-gap type semiconductor motor has a disc-shaped rotor, a pair of disc-shaped armatures coaxially located adjacent the opposite faces of the rotor with air-gaps therebetween, a system for detecting the rotational position of the rotor for generating an output proportional to the rotating speed of the rotor, and a semiconductor circuit operable in response to the output from the position-detecting system for controlling the armature current to effect constant-speed control of the rotation of the rotor. The rotor includes a field magnet. Two groups of armature coils are mounted on the face of each of the armature discs facing the rotor. The position-detecting system includes a control band which includes a plurality of control sections and which is synchronously rotatable with the rotor, and detectors which are located at fixed positions along the control band for generating an output in response to the control sections of the control band. The control band may be provided integrally around the periphery of the rotor.

Induction coils are provided, each being affixed to the central portion of each of the armature coils. The induction coils generate a three-phase output proportional to the rotating speed of the rotor. The output from the induction coils is rectified by a rectifying circuit and is applied to the current control circuit to provide a constant-speed control for the rotor.

17 Claims, 18 Drawing Figures

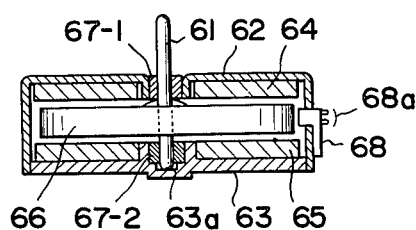
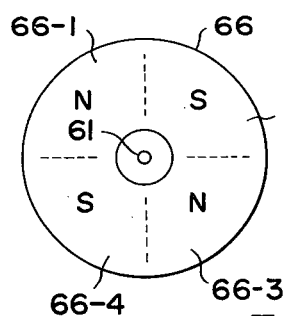
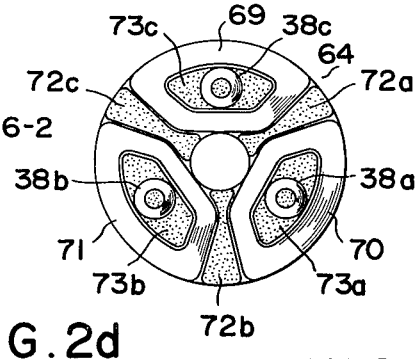
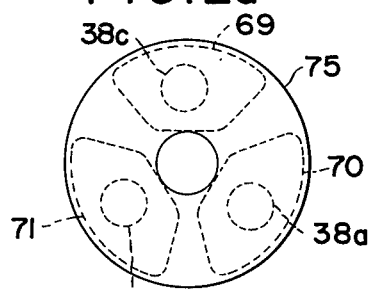
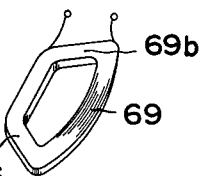
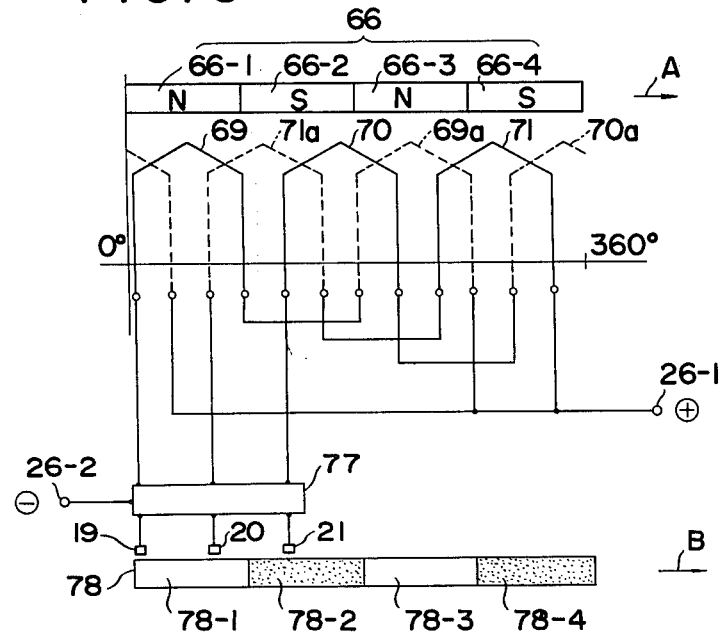

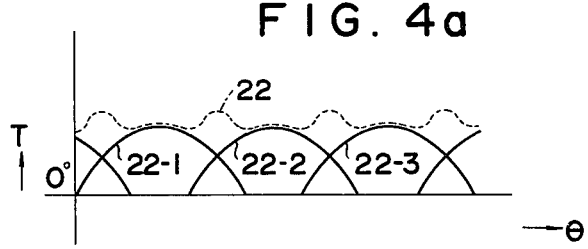
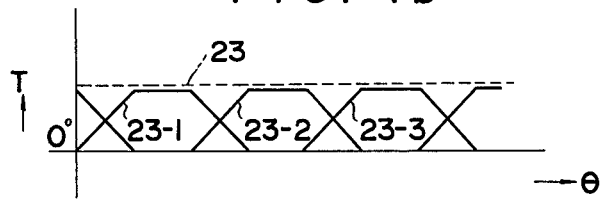
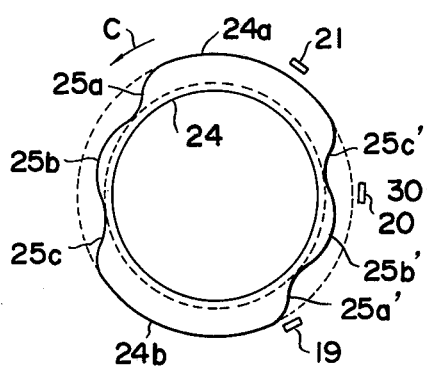
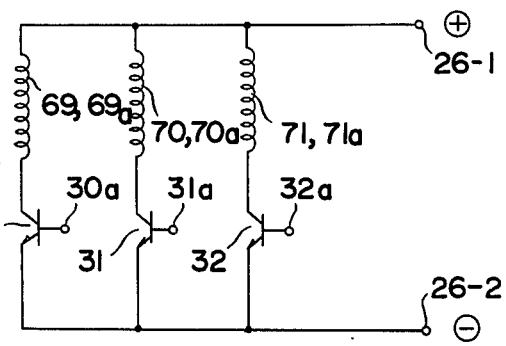
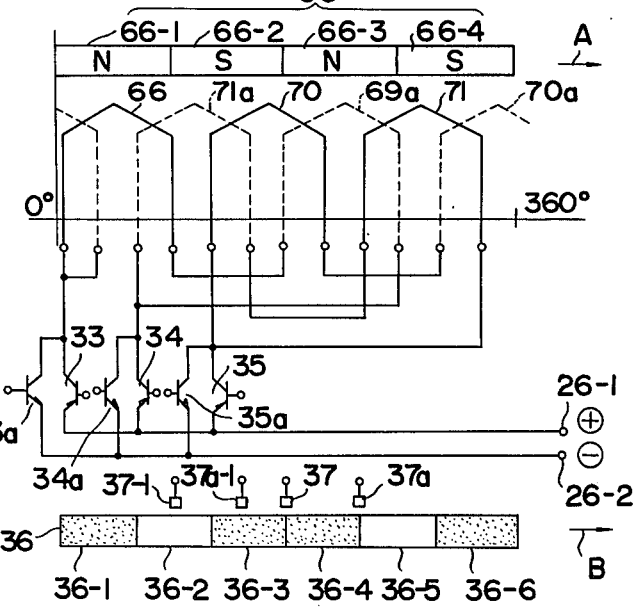

AXIAL-AIR-GAP TYPE SEMICONDUCTOR ELECTRIC MOTOR

BACKGROUND OF THE INVENTION

This invention relates to an improved DC semiconductor electric motor of an axial-air-gap type.

Semiconductor motors of various types of construction have been proposed. For musical instruments, for example, motors of the axial-air-gap type are preferred because this type can be made sufficiently flat in shape. Semiconductor axial-air-gap type motors also have the additional advantage of higher efficiency, better stability in performance, and improved durability. Notwithstanding these advantages, however, axial-air-gap type motors sometimes have had several difficulties. First, in a semiconductor axial-air-gap type motor, the field magnet usually serves as the rotor, resulting in large frictional losses caused by a large thrust load on the rotating shaft of the rotor due to axially-oriented magnetic forces on the shaft. While ball bearings, for example, may be used to reduce such frictional losses, their cost, however, will increase the ultimate cost of the motor and renders their use uneconomical.

Second, lap-wound or wave-wound armature coils are usually employed for achieving a high efficiency, and are arranged in a superimposed manner. Such a superimposed arrangement of the coils, however, increases the amount of air-gap in the magnetic field, thus resulting in a decrease in the magnetic field strength, thereby decreasing the efficiency and the starting torque of the motor. The effect of such decreases in efficiency and torque will be especially larger in small-sized motors; accordingly, motors as small as about 40mm or less in diameter will be of little practical use.

Third, an arrangement of superimposed armature coils such as the above will require a large amount of space in the motor.

Motors of the salient-pole type are known to the art and contain superimposed armature coils and induction coils which are superimposed thereon in the motor casing. These induction coils produce a direct output current proportional to the rotating speed of the rotor, which output current may be used as a constant-speed control thereof. In an axial-air-gap motor, however, the use of induction coils, which are superimposed on the superimposed armature coils, is impractical and placement of the induction coils between the armature coils is not a feasible alternative because of the superimposed arrangement of the armature coils. Accordingly, it is difficult to obtain a direct output current proportional to the rotating speed of the rotor for use as a constant-speed control for the motor. On the other hand, other alternatives to induction coils are excessively costly.

Fourth, fabrication of lap-wound or wave-wound coils is complicated and not readily susceptible to mass production techniques.

Fifth, employment of a three-pole type motor for the purpose of simplifying construction will cause an unbalanced force acting perpendicularly on the rotating shaft resulting in a decrease in durability due to the resultant wear of bearings and in an increase in mechanical noise.

Accordingly, it is a general object of the invention to provide a semiconductor electric motor of an axial-air-gap type which is simple in construction, of high durability, less noisy, susceptible to mass production, and of low cost.

It is another object of the invention to provide an axial-air-gap type semiconductor motor wherein the magnetic field contains only a small amount of air-gap to effect a high efficiency.

It is a further object of the invention to provide an axial-air-gap type semiconductor motor which has a sufficiently large output power while the motor is small in size.

A still further object of the invention is to provide an axial-air-gap type semiconductor motor which is provided with a disc-shaped rotor constituting a field magnet, armature disc confronting respectively the upper and lower faces of the rotor, and armature coils affixed on the faces of the armature discs.

A still further object of the invention is to provide an axial-air-gap type semiconductor motor which is provided with a control band which is coaxial to and rotatable synchronously with a rotor, and position detectors which are located in positions along the control band to generate an output proportional to the rotating speed of the rotor, thereby to effect a constant-speed control for the rotor by means of an output from the position detectors through a current control circuit.

A still further object of the invention is to provide an axial-air-gap type semiconductor motor which is provided with induction coils which are located respectively at the central portions of the armature coils to generate an output proportional to the rotating speed of the rotor thereby to serve as a constant-speed control for the rotor.

The above and other objects and advantages of the invention will be apparent from the following description of preferred embodiments with reference to the drawings.

SUMMARY OF THE INVENTION

An electric motor according to the present invention has a disc-shaped rotor made of a magnetic material. The disc-shaped rotor includes a field magnet having a plurality of magnetic poles which are alternately oppositely poled and which are circularly arranged at equal angular pitches. These magnetic poles are formed by magnetizing the rotor disc in the direction of the rotating axis of the rotor, i.e. by magnetizing respective portions of the disc alternately in N to S and S to N directions which are parallel to the central axis of the disc. A first and a second disc of magnetic material with air-gaps therebetween are respectively located opposite to the upper and lower faces of the rotor. Armature coils which are circularly arranged at angular pitches of about ⅔ of the angular width of the magnetic pole also located opposite to the upper and lower faces of the rotor. These armature coils are divided into a first group consisting of odd-numbered coils and a second group consisting of even-numbered coils. The first group of coils is affixed on the fact of the first magnetic-material disc facing the rotor, and the second group of coils is affixed on the face of the second magnetic-material disc facing the rotor. A control band, which is coaxial to and synchronously rotatable with the rotor, is provided. Position detectors are located respectively at predetermined positions along the control band, and are adapted to detect the rotational position of the rotor through the control band and generate an output current to control the armature current through a current control circuit for a constant-speed control for the rotor. Induction coils for generating three-phase alternating current may be respectively affixed at the central portions of the respective armature coils. The output current from these induction coils is rectified through a rectifying circuit, and the resultant direct current, which is proportional to rotating speed of the rotor, is adopted, together with the output from the position detectors, to control the armature current.

BRIEF DESCRIPTION OF THE DRAWINGS

In the drawings:

FIG. 1 is a side elevational view, partially in cross section, of a motor according to the invention;

FIG. 2a is a plan view illustrating the oppositely poled magnetic poles in a rotor used in the motor of the invention;

FIG. 2b is a plan view illustrating an armature used in the motor of the invention;

FIG. 2c is a perspective view illustrating an armature coil removed from the armature of FIG. 2b;

FIG. 2d is a plan view illustrating another embodiment of the armature;

FIG. 3 is a developed view for explaining the relationship between a field magnet and armature coils;

FIGS. 4a and 4b are graphs for explaining the torque applied on a rotor;

FIG. 5 is a plan view illustrating the position detection system used in a motor of the invention;

FIG. 6 shows an oscillation circuit used in the motor of the invention;

FIG. 7 shows a current control circuit used in the motor of the invention;

FIG. 8 is a developed view for explaining the relationship between the rotor and the armature coils in another embodiment of the invention;

DETAILED DESCRIPTION OF THE PREFERRED EMBODIMENTS

Figure 9A:
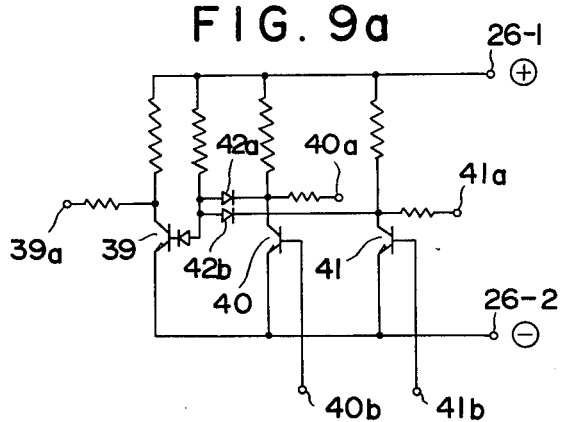
FIGS. 9a and 9b show electrical circuits for the position detection system used in conjunction with the embodiment of FIG. 8.

Referring to FIG. 1, which shows the overall outline of a motor according to the invention, an enclosed casing of the motor includes a cup-shaped covering 62 made by press processing and a bottom plate 63 made by die-casted aluminum. A bearing 67-1 is provided in the central portion of the top wall of the covering 62. A bearing 67-2, which is coaxial with the bearing 67-1, is fixed to the bottom plate 63. A rotating shaft 61 is supported for rotation by the bearings 67-1 and 67-2 and the top end portion of the shaft 61 protrudes outwardly of the covering 62. A disc-shaped rotor 66, which is made of ferrite, is fixedly secured coaxially to the shaft 61 so that the rotor 66 can rotate in the motor casing. The rotor 66 constitutes a field magnet which, as shown in FIG. 2a, has magnetic poles 66-1, 66-2, 66-3, and 66-4, which are circularly arranged at equal angular pitches, each of the poles having an angular width of 90°. These magnetic poles are formed by magnetizing the respective portions of the disc of the rotor 66 alternately in directions of N to S and S to N in polarity which directions are parallel to the rotating axis of the rotor 66. That is, the rotor 66 consists of the four magnetic poles circularly arranged at equal angular pitches in the order of N-S-N-S, and the pole 66-1, for example, is of N polarity on one side of the rotor 66, as depicted in FIG. 2a, and is of S polarity on the opposite side of the rotor 66. Soft-ferrite discs 64, 65 (FIG. 1), which confront respectively the opposite sides of the rotor 66 with air-gaps therebetween in a coaxial relationship, are attached respectively to the inner surface of the top wall of the covering 62 and to the inner surface of the bottom plate 63. A plurality of plastic supports 68 (one of the supports being shown in FIG. 1) are fixed to predetermined positions on the peripheral wall of the covering 62 for supporting position detectors which will be described later in this description. Each of the supports 68 has outlet terminals 68a for connecting the position detector to an electrical circuit which will be described in connection with the discussion of FIG. 6.

The discs 64 and 65 are of the same construction and accordingly details thereof will be described with respect to the disc 64 in connection with FIG. 2b. Referring to FIG. 2b, rise portions are integrally formed on one side of the disc 64 as indicated by the dotted portions 72a, 72b, 72c, and 73a, 73b, 73c, to form grooves between the rise portions for receiving armature coils 69, 70, 71, respectively. Each of the grooves has a depth of about one-half of the thickness of the armature coil. Such rise portions, and accordingly the grooves, can be easily formed into the desired configuration with high accuracy by a process of sintering a soft-ferrite material with the use of a sintering mold. The armature coils, as will be apparent from the description hereinafter, are required to be precise in configuration and are located in a precise relationship with respect to one another. With the above-mentioned grooves on the disc 64, the armature coils can be fit into and secured in the grooves with adhesives to maintain a precise configuration and to have a precise locational relationship between one another. Thus, the armature coils can form, together with the disc 64, an armature of high precision with ease. The armature coils can be mass produced at a low cost by winding self-bonding wire with an automatic winding machine whereby the wire is wound into coils and rigidified at the same time.

The armature coils 69, 70, and 71 are of similar construction. FIG. 2c shows the armature coil 69 as an example. The coil 69 has a generally sectorial shape. The angular width between the radially-extending conductor portions 69b and 69c of the coil 69, which are effective portions for generating torque for the rotor as will be describbed hereinbelow, is 90° which is equal to the angular width of a magnetic pole of the rotor 66.

Returning again to FIG. 2b, a plurality of generally circular induction coils 38a, 38b and 38c are affixed respectively at the central locations of the rise portions 73a, 73b and 73c which are enclosed respectively by the armature coils 70, 71, and 69. These induction coils can be made in a manner similar to that described in connection with the armature coils discussed above. Since current flowing through the induction coil is small, wire required for the induction coil may be of a small size. Accordingly, the induction coil can have a thickness as small as about a half of that of the armature coil. Thus, in the completed armature assembly 64, for example, the top surfaces of the induction coils 38a, 38b, and 38c may not be higher than the top surfaces of the armature coils 70, 71 and 69 even though the induction coils 38a, 38b and 38c are attached on the top surfaces of the rise portions 73a, 73b and 73c.

In conventional armatures having lap-wound armature coils, as will be seen from the description taken in connection with FIG. 3 hereinafter, the induction coils cannot be provided at the central portions of the respective armature coils because of the superimposed arrangement of the armature coils. According to the invention, however, the induction coils can be provided at the central portions of the respective armature coils without difficulty, and an output proportional to the rotating speed of the rotor 66 can be obtained by rectifying the output current from the induction coils by means of a rectifying circuit which will be described hereinafter in connection with FIG. 10. This rectified output signal thus serves as a constant-speed control for the rotor.

Referring now to FIG. 3 which is a developed view, the arrangement of the rotor and the armature coils in a motor will be discussed. The rotor 66, which constitutes a four-pole field magnet, rotates in the direction of the arrow A. The armature coils 69, 71a, 70, 69a, 71 and 70a are arranged in a manner similar to lap winding, and are located with respect to one another at angular pitches of 60° which is equal to ⅔ of the angular width of the magnetic pole of the field magnet 66. The armature coil 69 is connected in series to the armature coil 69a. Likewise, the coils 70 and 71 are connected in series respectively to the coils 70a and 71a. Accordingly, the armature coils may be considered also as a modified wave winding. Instead of the series connection, every two of the coils may be connected in parallel and, in this case, the coils will have the form of lap winding. An end of each of the series-connections of armature coils is connected in common to a positive terminal 26-1 of a power source, and the other ends of the series-connections are connected to a negative terminal 26-2 of the power source through a current control circuit 77 which will be described in detail hereinafter in connection with FIG. 7. A plurality of position detectors 19, 20, and 21 are connected with the control circuit 77. The detectors consist of Hall elements, oscillation coils, or the like. These detectors 19, 20, and 21 are associated respectively with the above-mentioned series-connections of armature coils, and are spaced from one another at angular intervals of 60°. The detectors 19, 20, and 21 are received respectively in the supports 68 (one of which is shown in FIG. 1) to confront a control band 78. In the case where the control band 78 is formed with field magnetic poles, outwardly leaking magnetic flux from the magnetic poles 66-1, 66-2, 66-3, and 66-4 of the rotor 66 (FIG. 2a) can be of use. The control band 78 rotates in the direction of arrow B, and includes four portions indicated by alternate dotted and non-dotted portions 78-2, 78-3, 78-4, and 78-1. The dotted portions 78-2 and 78-4 are S-poles and the non-dotted portions 78-1 and 78-3 are N-poles. The position detectors, which in this embodiment consist of Hall elements, are adapted to generate an output signal only when the Hall element encounters the N-poles of the control band 78 to render an associate transistor in the current control circuit 77 conductive thereby to control armature current. That is, the current is allowed to flow through the armature coils 69/69a, 70/70a, and 71/71a respectively only when the Hall elements 19, 21, and 20 encounter the N-poles of the control band 78.

The principle of the system for controlling armature current as described above is similar both in conventional semiconductor motors and in the motor of the present invention. But, in the conventional motors, the armature coils are superimposed on each other in two layers even in cases of the simplest arrangement of lap-winding. Accordingly, if the conventional motors are of the axial-air-gap type, the amount of the air-gap in the motor will increase to decrease the efficiency of the motor. Further, fabrication of the armature will be complicated. Moreover, provision of the induction coils 38a, 38b, and 38c will be impossible because of a deficiency of space in the motor and, accordingly, sufficient constant-speed control will be difficult.

According to the present invention, however, the armature coils are divided into a first group of 69, 70, and 71 (shown by a solid line), and a second group of 69a, 70a, and 71a (shown by a dotted line). The first group of coils 69, 70, and 71 is attached to the disc 64 (FIG. 1) by being received in the grooves formed on the underside face of the disc 64. The second group of the coils 69a, 70a, and 71a is attached to the disc 65 by being received in the grooves formed on the upper face of the disc 65. Thus, both the discs 64 and 65, together with their armature coils, constitute armatures. One disc 64 of these two discs has been described in detail in connection with FIG. 2b. It is necessary that the relational location of these armature coils is equivalent to the location shown by the development of FIG. 3. In the motor of the invention, the armature coils are located at equal angular pitches. Considering now with reference to FIG. 3, if the upper side of the magnetic pole 66-3, for example, is of N-polarity, the lower side of the pole 66-3 is of S-polarity and, accordingly, in the motor of the invention, the armature coil 69a, for example, which is depicted in FIG. 3 as existing just under the pole 66-3, should be shifted further by 90° from the position depicted in FIG. 3. Thus, in the motor of the invention, the relational location of the first group of armature coils 69, 70, and 71 to the second group of armature coils 69a, 70a, and 71a is shifted further by 90° as compared with the location depicted in FIG. 3. Accordingly, in the motor of the invention, air-gaps between the rotor 66 and the armature discs 64 and 65 (FIG. 1) can be minimized to effect a high efficiency. Further, the armature coils according to the invention are of a non-superimposed arrangement and, accordingly, are susceptible to mass production and low cost. Thus, in the motor of the invention, wherein the above-described induction coils 38a, 38b, and 38c (FIG. 2b) can be incorporated without difficulty, a direct output current proportional to the rotating speed of the rotor 66 can be obtained without difficulty.

While the grooves formed for receiving the armature coils on the disc 64 of FIG. 2b, for example, have been described as having a depth of about a half of the thickness of the armature coil, dipping of most of the thickness of the armature coils into the grooves will be more preferable. But such great amount of dipping of the armature coils will result in an increased cogging. For eliminating cogging to obtain smooth rotational torque, the following means as shown in FIG. 2d can be adopted. Referring to FIG. 2d, a disc-shaped armature core 75 is composed of disc-shaped silicon-steel plates accumulated in several layers. To the surface of the core disc 75 are arranged and affixed, in a similar way as in FIG. 2b, armature coils 69, 70, and 71, and also induction coils 38a, 38b, and 38c, as shown by dotted lines, thus constituting an armature which corresponds to the armature 64 or FIG. 2b. Another armature, which includes the armature coils 69a, 70a, and 71a and corresponds to the armature 65 (FIG. 1) is fabricated in the like manner as the above. With such armatures of silicon-steel-plate cores, cogging will be eliminated since there are no grooves on the cores. A motor which has such armatures of silicon-steel cores, however, will be low in rotating speed because of greater eddy-current loss in silicon-steel as compared with that in ferrite. Accordingly, the motor having the armatures of silicon-steel cores will be limited in application, and be suitable for use as a direct-drive motor for the turntable in a record player, for example.

Referring again to FIG. 1, the rotor 66 is subjected to an upward attractive force by the disc 64 and to a downward attractive force by the disc 65. These attractive forces are relatively strong, but can be equilibrated with respect to the rotor 66 by adjusting the vertical positioning of the rotor 66. The rotor 66 is adjusted to a position so that the downward attracting force acting on the rotor 66 is a little larger than the upward attracting force. The lower end of the rotating shaft 61 which is forced downward due to a difference between the downward and the upward attracting forces is sustained by the central portion 63a of the bottom plate 63. In a conventional axial-air-gap type motor, there is as a rule a disadvantage that a large thrust load is applied on the rotating shaft of the rotor and, accordingly, frictional loss resulting from the necessity of sustaining such thrust load is large. In the motor of the invention, however, such frictional loss can be minimized by adjusting the position of the rotor 66 so that upward and downward attractive forces acting on the rotor 66 may substantially cancel each other.

In conventional semiconductor motors of the salient-outer-pole type, if the motors use three-outer-poles for simplicity of construction, the attractive forces between the field magnet and the salient-poles will be unsymmetrical with respect to the rotating axis of the rotor. Consequently, a striking force will act between the rotating shaft of the rotor and the bearings thereof during rotation of the rotor to damage the bearings. Thus, the motors are not susceptible to practical use. Accordingly, in the prior art, the motors use a six-salient-poles to make the attractive forces between the field magnet and the salient-poles symmetrical to one another, thus cancelling the attractive forces which act on the rotating shaft in the transverse direction. Such conventional six-salient pole type motors, however, are complicated in construction especially in the arrangement of armature coils and are costly. Accordingly, the motors, despite their superior properties, are not widely used. In the motor of the invention, however, no transverse force acts on the rotating shaft, both theoretically and actually, to press the shaft against the bearings in the transverse direction. If some transverse forces were to arise against the rotating shaft in the motor of the invention, these forces would always be symmetrical to one another and, accordingly, no trouble will occur.

Referring now to FIG. 4a, consideration will be given to the torque arising against a rotor. While the value of current flowing through an armature, as a rule, varies according to the magnitude of the counter-electromotive force, discussion will be given here concerning a case of constant current flow. That is the case where a motor is under the constant-speed control by means of transistors, for example. The axis of abscissa of the graph of FIG. 4a indicates rotational angle $\theta$ of the rotor 66 and the axis of ordinate indicates the output torque T. The curves 22-1, 22-2 and 22-3 indicate respectively the torques which are due respectively to the sets of armature coils 69/69a, 70/70a and 71/71a which are supplied with current in this order. These curves are of an arc-shape which contains a variation of about 30 per cent. For eliminating such variation from the resultant torque, it is necessary that the respective component torques have a trapezoidal form as shown respectively by curves 23-1, 23-2, and 23-3 in FIG. 4b, wherein a rise portion, a horizontal portion, and a fall portion occupy ⅓ of one trapezoid respectively. The resultant torque curve thereby become flat as shown by a dotted line 23 in FIG. 4b.

Means for effecting such a flat resultant torque curve will now be described in connection with FIG. 5. Referring to FIG. 5, a ring-shaped control band 24 is made of a plastic molding, and is adapted to fit to the periphery of a rotor 66 (FIG. 1). The outer periphery of the ring of the control band 24 includes circular sections 24a and 24b of relatively large radius and wave-shaped sections, which are indicated by numerals 25a, 25b, 25c, and 25a', 25b', 25c' of relatively small radius. The circular sections 24a and 24b are symmetrical to each other with respect to the center axis of the ring 24, and the generally wave-shaped sections 25a, 25b, 25c, and 25a', 25b', 25c' are likewise symmetrical to each other. In the generally wave-shaped sections, opposite end portions 25a and 25c (or 25a' and 25c') are symmetrical to each other with respect to the central peak portion 25b (or 25b'). The surface of the outer periphery of the control band ring 25 is plated with nickel. Along this nickel-plated surface are provided oscillation coils as position detectors 19, 20, and 21 which are located at angular intervals of 60°. These oscillation coils correspond to the Hall elements described above in connection with FIG. 3. Each of the oscillation coils 19, 20, and 21 is an air-core coil of about 4mm in diameter and consisting of about 20 to 30 turns, for example.

A Colpitts oscillation circuit including the oscillation coil 19 is shown in FIG. 6. Referring to FIG. 6, the opposite ends of the oscillation coil 19 are connected respectively to the terminals 68a of the support 68 (FIG. 1). An end of the coil 19 is also connected to the positive terminal 26-1 of the power source through a transistor 28. Thus, current flowing through the Colpitts circuit can be controlled by input signals which are applied to the transistor 28 through a terminal 28a connected thereto. The other end of the coil 19 is connected to the negative terminal 26-2 of the power source through a transistor 27 and through a smoothing circuit which contains a smoothing condenser 29. The oscillation frequency of this Colpitts oscillation circuit is about 2MHz, for example. The oscillation output from this oscillation circuit is delivered through a terminal 26-3, which is connected to the emitter of the transistor 27, and the terminal 26-2.

When the oscillation coil 19 encounters the large-radius section 24a or 24b of the control band 24 (FIG. 5), the oscillation will be stopped or minimized because of increased eddy-current loss and hysteresis loss due to the nearness of the nickel-plated surface of the control band 24 to the coil 19. When the coil 19 encounters the small-radius section 25a-25b-25c (or 25a'-25b'-25c'), eddy-current loss and hysteresis loss will decrease generally in inverse proportion to the distance from the nickel-plated surface of the control band 24 to the coil 19. Accordingly, the output oscillation having an amplitude corresponding to the wave-shaped curve of the small-radius section can be obtained. As a result, it has been confirmed by experiment that an output curve analogous to the trapezoidal curve 23-1 of FIG. 4b could be obtained. The central peak portion 25b (or 25b') in the wave-shaped section of the control band 24 serves to make the oscillation output from the oscillation coil relatively small so that the peak portion in the torque curve 21-1 of FIG. 4a may become flattened. As will be understood from the above discussion, by employing the control band 24, the wave-form of the output from the terminals 26-2 and 26-3 takes a trapezoidal shape which has a flat peak portion and is analogous to the curve 23-1 in FIG. 4b. This is the same with other Colpitts oscillation circuits (not shown) including respectively the oscillation coils 20 and 21, and outputs from these other oscillation circuits show trapezoidal wave-forms which are analogous to the curves 23-2 and 23-3, in FIG. 4b, respectively. The transistor 28 in FIG. 6 is adapted to rapidly reduce input direct current, which is supplied to the Colpitts circuit through the terminal 28a, when the rotating speed of the rotor 66 (FIG. 1) exceeds a predetermined value. Accordingly, when the rotating speed of the rotor 66 exceeds the predetermined value, the amplitude of oscillation from the Colpitts circuit, i.e. output from the terminals 26-2 and 26-3, rapidly reduces. This is the same with the other Colpitts circuits which include the oscillation coils 20 and 21, respectively. The relative phases of the oscillation outputs from the respective Colpitts circuits which include the oscillation coils 19, 20, and 21 are out of phase by 60° from one another, being analogous to the solid-line graphs of FIG. 4b. Accordingly, the wave form of the resultant output of the above-mentioned three outputs is flat, being analogous to the dotted line 23 of FIG. 4b.

The above-described position-detection outputs which are derived from the respective Colpitts circuits including the position-detection oscillation coils 19, 20, and 21 are applied to the current control circuit 77 (FIG. 3). The current control circuit 77 includes, as shown in FIG. 7, a plurality of transistors 30, 31, and 32 which are connected in series respectively to the sets of armature coils 69/69a, 70/70a, and 71/71a. These series-connections of the transistors and the armature coils are connected in parallel with one another between the positive terminal 26-1 and the negative terminal 26-2 of the power source. The output from the oscillation circuit including the oscillation coil 19 (FIG. 6) is applied through the terminal 26-3 to a base terminal 30a of the transistor 30. Likewise, the outputs from the oscillation circuits including respectively the oscillation coils 20 and 21 are applied respectively to the base terminals 31a and 32a of the respective transistors 31 and 32. By the above-mentioned outputs from the oscillation circuits, the respective transistors 30, 31, and 32 are controlled in operation. Thus, the respective sets of armature coils 69/69a, 70/70a, and 71/71a are supplied, in sequence, with currents which are proportional respectively to the outputs from the abovementioned oscillation circuits, and accordingly rotational torques are generated. The curve of the resultant torque of these torques is flat, being analogous to the dotted line 23 in FIG. 4b and, accordingly, the motor of the invention will be an ideal drive motor for musical instruments, for example. Further, electrical or mechanical noise in the motor of the invention is very small because variation of armature current is smooth and gradual. If desired, a constant-speed control can be achieved by means of an input signal to the terminal 28a (FIG. 6).

Referring again to FIG. 5, the features of the position detecting system according to the invention will be further described in detail. For controlling outputs of oscillation coils to effect torque curves analogous to the curves of FIG. 4b, there might be other means than those of the invention described above. For example, instead of varying in radius, the outer periphery of control band 24 is formed of a uniform radius, and area of width of the conductor (e.g. nickel plating) thereon, which is to confront the oscillation coils 19, 20, and 21 is varied so that the output of the oscillation coil may be varied according to the variation in the area of the conductor which confronts the oscillation coil. With such construction, however, error in the transverse position (i.e. the position in the direction of the width of the conductor) of the oscillation coil relative to the conductor of the control band as well as error in the distance between the oscillation coil and the conductor has an influence on the output of the oscillation coil. Accordingly, the control band will need to rotate with respect to the oscillation coils with accuracy that both of the above-mentioned two errors can be within a range of about 5/100 mm. However, it is very difficult to obtain a relational rotation of the control band and the oscillation coils with such accuracy and, accordingly, the practicality of the motor will be lost. With the system of FIG. 5 which is employed in the motor of the invention, however, variation of the output of the oscillation coil depends only upon a variation in the distance between the conductor of the control band and the oscillation coil, not upon variation in area of the conductor. Accordingly, with the system of FIG. 5, by making the diameter of the oscillation coils 19, 20, and 21 sufficiently small as compared with the width of the control band 24 (nickel plating) error in the transverse position of the oscillation coil with respect to the control band will have no significant effect. In addition, it is easy to maintain the accuracy of the distance between the outer periphery of the rotor 66 (FIG. 1), and accordingly of the control band 24, and the rotating axis thereof within a range of about 1/100 mm. Accordingly, with the system of FIG. 5, undesirable influence on the output of the oscillation coil due to error in the distance between the control band and the coil can be substantially negligible. Further, the system of FIG. 5 is susceptible to mass production.

Figure 10:
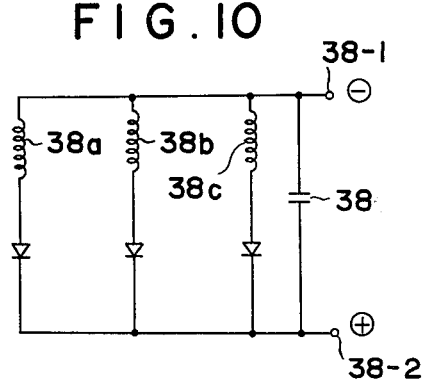
FIG. 10 shows a rectifying circuit for induction coils used in the motor of the invention.

Referring now to FIG. 10, a circuit for output from the induction coils 38a, 38b, and 38c (FIG. 3b) will be described. The induction coils 38a, 38b, and 38c with respective series-connected diodes, are connected in parallel to one another between a negative terminal 38-1 and a positive terminal 38-2. A smoothing condenser 38 is also connected in parallel with the induction coil-diode series circuits and across the terminals 38-1 and 38-2. The output from the coils 38a, 38b, and 38c are 120° out-of-phase with respect to one another; accordingly, the output from the terminals 38-1 and 38-2 will be a direct current. This direct output current, which has been smoothed by means of the condenser 38, is proportional to the rotating speed of the rotor 66 (FIG. 1), and is supplied to the terminal 28a of the circuit of FIG. 6.

FIG. 8 shows another embodiment wherein current flows through armature coils alternately in opposite directions, i.e. current flows through an armature coil in one direction at the time of encountering an N-pole of a field magnet and then in the opposite direction at the time of encountering an S-pole, thereby to double the amount of torque for the rotor to increase the efficiency of the motor. In FIG. 8, similar numerals indicate like parts as in FIG. 3; accordingly, detailed description thereof will be omitted. Similarly as in FIG. 3, the armature coils are divided into a group of coils 69, 70, and 71 and a group of coils 69a, 70a, and 71a, these groups of coils being affixed to the soft-ferrite discs 64 and 65 (FIG. 1) respectively. The armature coils are arranged at angular pitches of ⅔ of the angular width of one magnetic pole of the field magnet. Unlike the armature coils of FIG. 3, the armature coils 69, 69a, 70, 70a, 71, and 71a of FIG. 8 are wave-wound. The coil 69 is connected in series to the coil 69a. Likewise, the coil 70 is connected in series to the coil 70a, and the coil 71 is series-connected to the coil 71a. The outer end of the coil 69 is connected through a PNP transistor 33 to a positive terminal 26-1 of a power source and is also connected through a NPN transistor 33a to a negative terminal 26-2 of the power source. The outer end of the coil 69a is connected through a PNP transistor 34 to the positive terminal 26-1 and is also connected through a NPN transistor 34a to the negative terminal 26-2. The outer end of the coil 70 is connected through a PNP transistor 35 to the positive terminal 26-1 and also is connected through an NPN transistor 35a to the negative terminal 26-2. The outer end of the coil 70a is connected through the transistor 33 to the terminal 26-1 and also is connected through the transistor 33a to the terminal 26-2. The outer end of coil 71 is connected through the transistor 35 to the terminal 26-1 and also is connected through the transistor 35a to the terminal 26-2. The outer end of the coil 71a is connected through the transistor 34 to the terminal 26-1 and also is connected through the transistor 34a to the terminal 26-2. As will be seen from the arrangement shown in FIG. 8, it is perferable that the number of poles of the field magnet is four or more and the total number of armature coils is an even number.

The position detecting system is as follows. A plastic ring of a uniform wall thickness is fit around the rotor 66 (FIG. 1). The outer peripheral surface of this plastic ring is partially provided with nickel films, which are formed by plating the peripheral surface of the plastic ring with nickel and then partially removing the nickel plating by means of an etching treatment. The development of the peripheral surface of the plastic ring is shown as a control band 36, wherein sections 36-1, 36-2, 36-3, 36-4, 36-5, and 36-6 are formed in this order in the longitudinal direction, dotted sections 36-1, 36-3, 36-4 and 36-6 being nickel-plated sections, and non-dotted sections 36-2 and 36-5 being non-plated or plastic-exposed sections. The sections 36-1 through 36-6 have an angular width of 60° each. The control band 36 rotates in the direction of arrow B. Along the control band 36 are located oscillation coils 37, 27-1, 37a, and 37a-1 which coils are received in the supports 68 (FIG. 1) respectively. The angular intervals between the coils 37 and 37a and the angular interval between the coils 37-1 and 37a-1 are each 60°. The angular interval between the coils 37 and 37-1 is 90°, which is equal to the angular width of the pole of the field magnet. The Colpitts oscillation circuits including respectively the oscillation coils 37, 37-1, 37a, and 37a-1 are provided, though not shown in the figure. When the oscillation coil 37 or 37a encounters the non-plated section 36-2 or 36-5 of the control band 36, the coil generates an output which is of a rectangular wave-form.

The operation concerning the oscillation coils 37 and 37a will now be described with reference to FIG. 8 and a circuit shown in FIG. 9a which is connected with the coils 37 and 37a. Referring to FIG. 9a, the transistors 39, 40, and 41 are, through respective series-connected resistances, connected in parallel with one another between the positive terminal 26-1 and the negative terminal 26-2 of the power source. The base of the transistor 39 is connected to the positive terminal 26-1 through a diode and a resistance. The base of the transistor 39 is also connected, through the above-mentioned diode and a diode 42a which is series-connected in reverse thereto, to the collector of the transistor 40 and, through the above-mentioned diode and a diode 42b which is series-connected in reverse thereto, to the collector of the transistor 41. A base terminal 40b of the transistor 40 and a base terminal 41b of the transistor 41 are connected respectively to the output terminals of the oscillation coils 37 and 37a (FIG. 8). At the state depicted in FIG. 8, the oscillation coils 37 and 37a confront respectively the nickel-plated sections 36-3 and 36-4 of the control band 36; accordingly, there is no output from the coils 37 and 37a. Consequently, the transistors 40 and 41 (FIG. 9a) are non-conductive, the transistor 39 is conductive and, accordingly, an output is obtained from an output terminal 39a, which is connected through a resistance to the collector of the transistor 39. This output from the terminal 39a is applied to the base of the transistor 33 (FIG. 8) and, accordingly, the transistor 33 becomes conductive. Then, upon 60° rotation of the control band 36 in the direction of the arrow B with rotation of the rotor 66 (FIG. 1), the oscillation coil 37 encounters the non-plated section 36-2. Under this condition, an output is obtained from the coil 37. This output from the coil 37 is applied to the base terminal 40b of the transistor 40. Consequently, the transistor 40 becomes conductive and an output is obtained from an output terminal 40a which is connected through a resistance to the collector of the transistor 40. At this time, the transistor 39 becomes non-conductive since the base voltage thereof decreases through the diode 42a. The output from the terminal 40a is applied to the base of the transistor 34 (FIG. 8) to render the transistor 34 conductive. Under a further 60° rotation of the control band 36, the oscillation coil 37a encounters the non-plated section 36-2 and an output is obtained from the coil 37a. The output from the coil 37a is applied to the base terminal 41b of transistor 41 to render the transistor 41 conductive. Under this condition, an output is obtained from an output terminal 41a which is connected through a resistance to the collector of the transistor 41. The output from the terminal 41a is applied to the base of the transistor 35 (FIG. 8) to render the transistor 35 conductive. At this time, the transistor 39 (FIG. 9a) is kept non-conductive due to a decreased base voltage supplied thereto through the diode 42b. Upon a further 60° rotation of the control band 36 (FIG. 8), the oscillation coils 37 and 37a, encounter respectively the nickel-plated sections 36-6 and 36-1 and, accordingly, the outputs of the coils 37 and 37a become null. Thus, in the circuit of FIG. 9a, only the transistor 39 becomes conductive and, consequently, the transistor 33 (FIG. 8) becomes conductive again. Thus, with every 60° rotation of the control band 36, the transistors 33, 34, and 35 become conductive in a cyclic fashion.

Figure 9B:
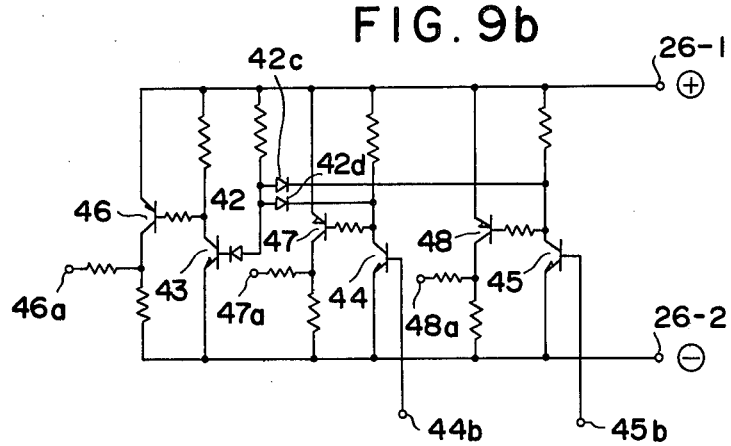

Operation concerning the oscillation coils 37-1 and 37a-1 will now be described with reference to FIG. 8 and a circuit shown in FIG. 9b which is connected with the coils 37-1 and 37a-1. Referring to FIG. 9b, the transistors 43, 44, 45, 46, 47, and 48 are, through respective series-connected resistances, connected in parallel with one another between the positive terminal 26-1 and the negative terminal 26-2 of the power source. The base of the transistor 43 is connected to the positive terminal 26-1 through a diode 42 and a resistance, and is also connected, through the diode 42 and a diode 42d which is series-connected in reverse thereto, to the collector of the transistor 44, and, through the diode 42 and a diode 42c which is series-connected in reverse thereto, to the collector of the transistor 45. The bases of the transistors 46, 27, and 48 are connected, through respective resistances, to the collectors of the transistor 43, 44, and 45 respectively. A base terminal 44b of the transistor 44 and a base terminal 45b of the transistor 45 are connected respectively to the output terminals of the oscillation coils 37-1 and 37a-1 (FIG. 8). At the state depicted in FIG. 8, the oscillation coil 37-1 confronts the non-plated section 36-2 of the control band 36 to offer output, and the oscillation coil 37a-1 confronts the nickel-plated section 36-3 to offer no output. Accordingly, the transistor 44 (FIG. 9b) is conductive and the transistor 45 is non-conductive. Consequently, the transistor 47 is conductive and, accordingly, an output is obtained from an output terminal 47a, which is connected through a resistance to the collector of the transistor 47. At this time, the transistors 43 and 46 are non-conductive due to decreased base voltages through the diode 42d. Thus, an output of the circuit of FIG. 9b can be obtained only from the terminal 47a. This output from the terminal 47a is applied to the base of the transistor 34a (FIG. 8) to render the transistor 34a conductive. Then, upon 30° rotation of the control band 36 in the direction of the arrow B, the oscillation coil 37a-1 encounters the non-plated section 36-2 and, accordingly, an output is obtained from the coil 37a-1. This output of the coil 37a-1 is applied to the terminal 45b (FIG. 9b) to render the transistor 454 and the transistor 48 conductive; accordingly, an output is obtained from an output terminal 48a, which is connected through a resistance to the collector of the transistor 48. This output from the terminal 48a is applied to the base of the transistor 35a (FIG. 8) to render the transistor 35a conductive. At this time, the transistors 43 and 46 (FIG.9b), are kept non-conductive due to decreased base voltage applied thereto through the diode 42c. Thus, there is no output on an output terminal 46a, which is connected through a resistance to the collector of the transistor 46. In addition, an output of the oscillation coil 37-1 (FIG. 8) becomes null because the coil 37-1 confronts the nickel-plated section 36-1 of the control band 36. Thus, the output on the terminal 47a (FIG. 9b) becomes null. Upon a further 60° rotation of the control band 36 (FIG. 8), the oscillation coils 37-1 and 37a-1 encounter respectively the nickel-plated sections 36-6 and 36-1 and, accordingly, the outputs of the coils 37-1 and 37a-1 become null. Thus, in the circuit of FIG. 9b, only the transistors 43 and 46 are conductive and an output is obtained from the terminal 46a. This output from the terminal 46a is applied to the base of the transistor 33a (FIG. 8) to render the transistor 33a become conductive in a cyclic fashion.

As can be seen from the above description, with rotation of the control band 36, the transistors 33, 34, and 35 become conductive in a cyclic fashion to allow current to flow in sequence through the armature coils in one direction, the current flowing through the respective armature coils being at an out-of-phase state equal to the width of the field-magnet pole. Then, the transistors 33a, 34a, and 35a become conductive in a cyclic fashion to allow current to flow in sequence through the armature coils in the opposite direction at the similar out-of-phase state. Thus, by a selective switching action of the transistors as described above, current flow through the armature coils alternately in opposite directions to effect doubled torque to increase efficiency. The manner of current supply as described above is similar to the manner in a conventional DC motor which includes brushes angularly spaced at 90° intervals to receive current from positive and negative terminals of a power source and includes commutator bars angularly spaced at 60° intervals. Thus, according to the invention, a semiconductor motor having a high efficiency, wherein the rotor 66 and the control band 36 rotate respectively in the directions of arrows A and B, can be obtained. The motor of this embodiment has advantages similar to those in the previous embodiment and has further the merits of an increased efficiency and an increased output torque. Another position detecting system, which includes Hall elements in place of the oscillation coils, for example, can alternatively be employed.

Figure 11:
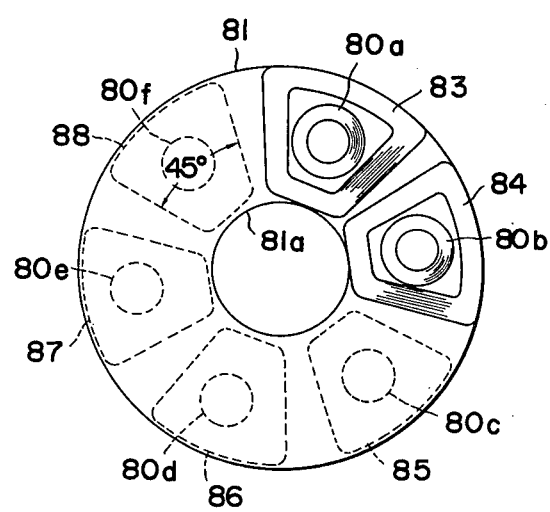
FIG. 11 is a plan view illustrating still another embodiment of the armature.
Figure 12:
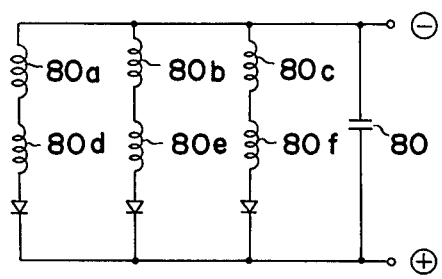
FIG. 12 shows a rectifying circuit for induction coils used in conjunction with the armature of FIG. 11.

Still another embodiment which is low in rotating speed and is used as a drive motor for the turntable in a record player, for example, will now be described. In the case of the motor of this embodiment, when used in a record player, the rotating shaft itself of the motor is used as the rotating shaft to the turntable. In order to obtain a smoother rotational torque, the motor has eight field-magnet poles each having an angular width of 45°. An armature of the motor is shown in FIG. 11. Referring to FIG. 11, a plurality of generally sectorial armature coils 83, 84, 85, 86, 87, and 88 are arranged at equal angular pitches and are affixed on a silicon-steel-plate core 81 which is composed of several pieces of silicon-steel plates accumulated on one another and is provided in its central portion with an opening 81a. Each of the armature coils has, between two radial conductor portions thereof which are effective for torque, an angular width of 45° which is equal to that of the magnetic pole of a field magnet used in the motor. This 45° value of the angular width is indicated in FIG. 11 with respect to the armature coil 88 as an example. A plurality of generally circular induction coils 80a, 80b, 80c, 80d, 80e and 80f are affixed respectively to the central portions of the respective armature coils. The number of induction coils may, in principle, be three, similarly to the situation described in connection with the previous embodiment. In this embodiment, however, six induction coils are provided and every two of them are connected in series with each other to increase the inductive output, because the motor of the embodiment is low in rotating speed and the output by one induction coil is small. Connection of the induction coils is shown in FIG. 12, wherein every two of the induction coils 80a/80d, 80b/80e, and 80c/80f are connected in series to each other and these series-connections of coils are connected, through respective series-connected diodes, in parallel with one another. A smoothing condenser 80 is also connected in parallel to smooth current from the induction coils thereby to deliver a direct output voltage, which is proportional to the rotating speed of the rotor, through output terminals. This output voltage is applied to the terminal 28a of the circuit of FIG. 6.

Figure 13:
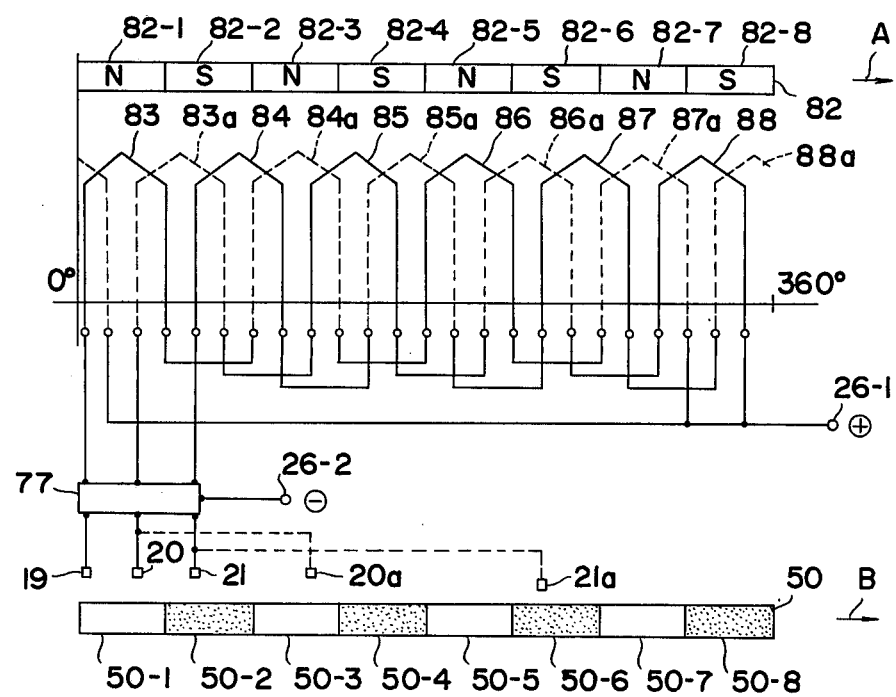
FIG. 13 is a developed view for explaining the relationship between the armature of FIG. 11 and the rotor used in conjunction with the armature.

Referring now to FIG. 13 which shows the development of the armature coils and a rotor, details of this embodiment will be described. A field magnet 82 which itself is a rotor consists of eight magnetic poles 82-1 through 82-8, which are circularly arranged and have an angular width of 45° each. The armature coils 83-88 are, as have been described in connection with FIG. 11, affixed to the silicon-steel-plate core 81 to constitute an armature which corresponds to the armature 64 of FIG. 1. The armature coils 83a, 84a, 85a, 86a, 87a and 88a are arranged in a similar manner as the coils 83-88 and are affixed to another silicon-steel-plate core (not shown), which is the same in construction as the core 81, to constitute another armature which corresponds to the armature 65 of FIG. 1. The armature coils 83, 84a, 86 and 87 are connected in series to one another. Likewise, other every four of the armature coils 83a, 85, 86a, and 88 and coils 84, 85a, 87 and 88a are connected in series to one another. An end of each of these series-connections of armature coils is connected, in common, to the positive terminal 26-1 of the power source. The other ends of the series-connections are connected to the negative terminal 26-2 of the power source through a current control circuit 77. This current control circuit 77 has the same construction as that of FIG. 7 and includes transistors 30, 31, and 32 which control respectively currents flowing through the above-mentioned series-connections of armature coils. While in this embodiment the armature coils are, by groups of four, connected in series to one another, parallel connection or series parallel connection may alternatively be employed. For position detectors, oscillation coils 19, 20, and 21 which have been described in connection with FIGS. 5 and 6, are employed. A control band 50, which faces the oscillation coils, is made of a plastic ring which has a construction similar to the ring 24 of FIG. 5 and is fixed coaxially to the rotating shaft of the rotor 82, being separated from the rotor 82 because the rotor 82 is large in radius. The surfaces of the outer periphery of the ring 50 is plated with nickel and has sections 50-1 through 50-8 which are circularly arranged in this order and have an angular width of 45° each. Non-dotted sections 50-1, 50-3, 50-5 and 50-7 are small-radius sections, which correspond to the small-radius sections 25a, 25b, 25c and 25a', 25b', 25c' of FIG. 5, where an output is obtained from the oscillation coils in a controlled fashion. Dotted sections 50-2, 50-4, 50-6, and 50-8 are large-radius sections, where output from the oscillation coils becomes null. The rotor 82 and the control band 50 rotate respectively in the directions of arrows A and B. Accordingly, a current control for the armature coils is effected in a similar manner as in the previous embodiment. The operation and effect of this embodiment are similar to those of the previous embodiment. In this embodiment, however, torque ripple is less because of an increased number of the field-magnet poles to 8 poles. the oscillation coils 20 and 21, which serve as the detectors, may be shifted respectively to alternative positions 20a and 21a. By employing a system of providing current to the armature coils alternately in opposite directions, which is similar to the system described in connection with FIG. 8, torque and efficiency can be increased.

While preferred embodiments have been described, various changes and modifications can be made without departing from the spirit and scope of the invention.

What is claimed is:

1. An axial-air-gap type semiconductor motor comprising:

a disc-shaped rotor fixed coaxially to a shaft mounted for rotation to a casing for the motor, the disc of said rotor comprising a field magnet having a plurality of magnetic poles formed of portions of said disc located in the circular direction at equal pitches, said magnetic poles being magnetized alternately in opposite polarization directions along the rotating axis of said rotor;

a first magnetic-material disc and a second magnetic material disc coaxially located respectively adjacent the opposite faces of said rotor with air-gaps therebetween and being fixed to said casing;

a plurality of armature coils arranged in turn at angular pitches of a predetermined proportion of the angular width of the pole of said field magnet, odd-numbered ones of said armature coils being affixed to the face of said first magnetic-material disc which faces said rotor, and even-numbered ones of said armature coils being affixed to the face of said second magnetic-material disc which faces said rotor;

a control band rotatable synchronously with said rotor;

position-detector means located at fixed positions along the rotating path of said control band for detecting rotational position of said rotor in cooperation with said control band to generate an output corresponding to the rotational position of said rotor; and a current control semiconductor circuit for controlling, in response to the output from said position-detector means, current flowing through said armature coils.

2. A motor according to claim 1 wherein the position of said rotor is axially adjustable with respect to said magnetic-material discs.

3. A motor according to claim 1 wherein said armature coils are wave wound.

4. A motor according to claim 1 wherein said armature coils are lap wound.

5. A motor according to claim 1 wherein each of said armature coils is arranged in turn at angular pitches of ⅔ of the angular width of the pole of said field magnet.

6. A motor according to claim 1 wherein each of said armature coils has an angular width equal to the angular width of the pole of said field magnet.

7. A motor according to claim 1 wherein the total number of said armature coils is an even number.

8. A motor according to claim 1 wherein said first and said second magnetic-material discs comprise faces which include grooves thereon for engagement with said armature coils, and said armature coils are secured to said magnetic-material discs in such a manner that at least a portion of the thickness of the respective armature coils is dipped into said grooves.

9. A motor according to claim 8 wherein said magnetic-material discs consist of sintered ferrite blocks.

10. A motor according to claim 1 wherein magnetic-material discs consist of lamination layers of silicon-steel plates.

11. A motor according to claim 1 wherein said control band consists of the peripheral surface of said rotor which includes a plurality of magnetic poles circularly arranged at equal angular pitches and having alternately opposite polarities, whereby output from said position-detector means is controlled by a mutual magnetic relationship between said control band and said position-detector means.

12. A motor according to claim 1 wherein said control band consists of a conductor which is secured about the peripheral surface of said rotor with an insulation layer interposed therebetween, the distance from the outer peripheral surface of said conductor to the rotating axis of said rotor being partially varied so that, with rotation of said rotor, the space between said control band and said position-detector means may vary, whereby output from said position-detector means is controlled by variation in space between said control band and said position-detector means.

13. A motor according to claim 1 wherein said control band consists of an insulator layer which is secured about the peripheral surface of said rotor, and conductors which partially cover the outer peripheral surface of said insualtor layer arranged so that insulator-exposed sections and conductor sections alternately occur along the outer peripheral surface of said insulator layer, whereby, with rotation of said rotor, output from said position-detector means is controlled by encountering said position-detector means alternately with said insulator-exposed and conductor sections.

14. A motor according to claim 1 wherein said position-detector means comprise Hall elements.

15. A motor according to claim 1 wherein said position-detector means comprise oscillation coils.

16. A motor according to claim 1 further including a second position-detector means to generate a second output in accordance with rotational position of said rotor, and a second current control semiconductor circuit for controlling, in response to the output from said second position-detector means, current flowing through said armature coils so that the current may be out of phase by the angular width of the pole of said field magnet, whereby current flows through said armature coils alternately in opposite directions.

17. An axial-air-gap type semiconductor motor comprising:

a disc-shaped rotor fixed coaxially to a shaft mounted for rotation to a casing for the motor, the disc of said rotor constituting a field magnet having a plurality of magnetic poles formed of portions of said disc which take their places in the circular direction at equal angular pitches and have been magnetized alternately in opposite polarization directions along the rotating axis of said rotor;

a first magnetic-material disc and a second magnetic-material disc coaxially located respectively adjacent the opposite faces of said rotor with air-gaps therebetween and being fixed to said casing;

a plurality of armature coils arranged in turn at angular pitches of $\frac{2}{3}$ of the angular width of the pole of said field magnet, odd-numbered ones of said armature coils being affixed to the face of said first magnetic-material disc which faces said rotor, and even-numbered ones of said armature coils being affixed to the face of said second magnetic-material disc which faces said rotor;

a control band rotatable synchronously with said rotor;

position detector means located at fixed positions along the rotating path of said control band for, through said control band, detecting rotational position of said rotor to generate an output corresponding to the rotational position of said rotor;

a current control semiconductor circuit for controlling, in response to the output from said position-detector means, current flowing through said armature coils;

induction coils affixed respectively at portions which are surrounded respectively by the windings of said armature coils for generating, in accordance with rotation of said rotor, a three-phase alternating current; and a circuit for rectifying the alternating current from said induction coils and applying the resultant rectified current to said current control semiconductor circuit thereby to serve for the controlling of current flowing through said armature coils.

* * * * *